April 2, 1940.  W. E. WALLACE, JR  2,195,548
EXPOSURE METER
Filed July 3, 1937
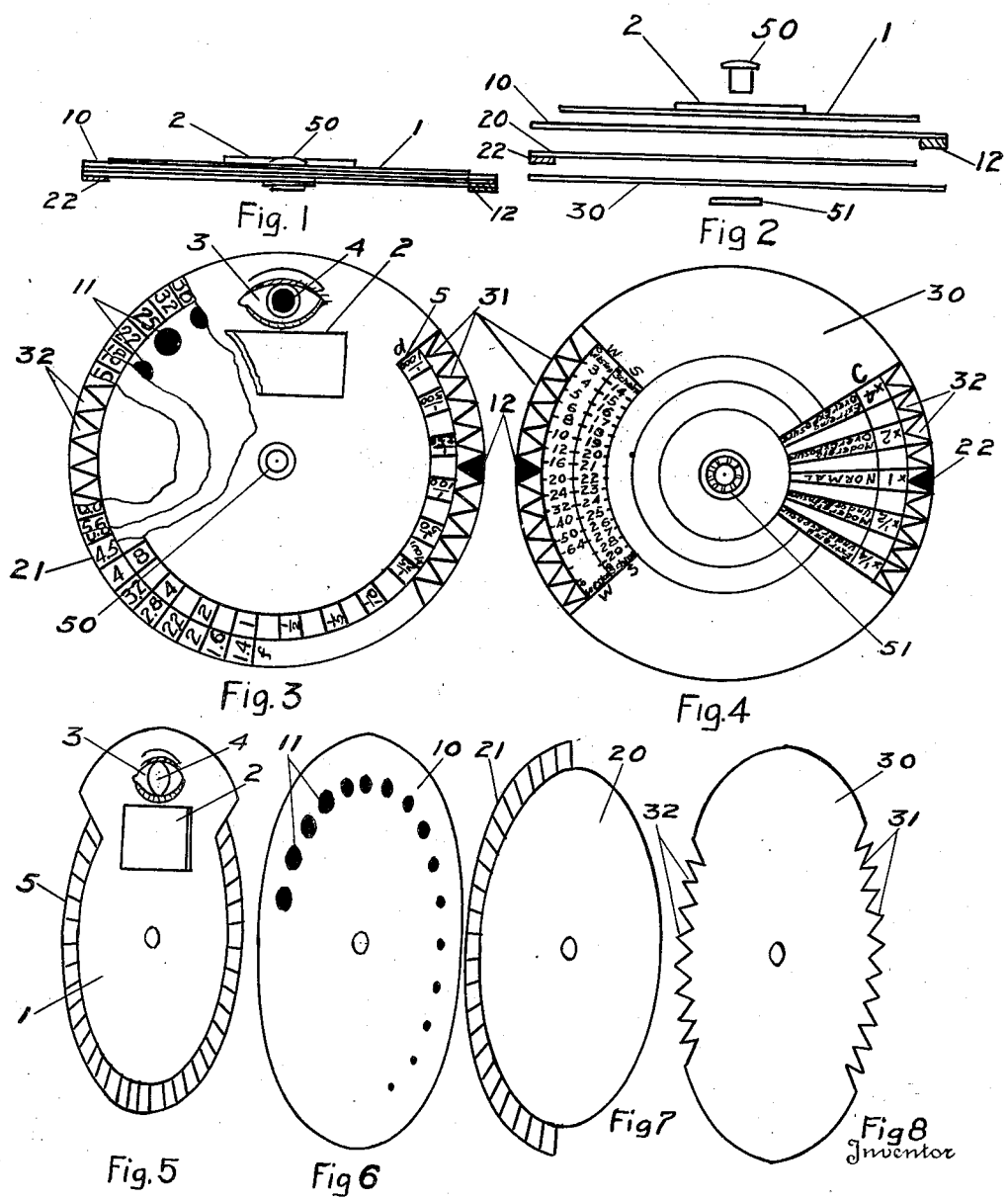
William E. Wallace Jr.
By A. F. Flournoy
Attorney Patented Apr. 2, 1940

2,195,548

UNITED STATES PATENT OFFICE 2,195,548

EXPOSURE METER

William E. Wallace, Jr., Shreveport, La.

Application July 3, 1937, Serial No. 151,866

3 Claims. (Cl. 88—23)

This invention relates to exposure meters.

One of the chief difficulties encountered in photography, especially by amateur photographers, is the correct estimation of the light values presented by the subject to be photographed and the selection of the corresponding diaphragm aperture and the time of exposure with, of course, due consideration of the speed of the emulsion which is in use. Unless a photographer has considerable skill in estimating these values a large proportion of the resulting pictures will be more or less imperfect.

The production of a perfect photograph requires a correct correlation of the following factors:

The amount of light illuminating the subject.

The predominant wave lengths of that light.

The speed or sensitivity of the negative emulsion to be used. As the sensitivity of negative emulsions varies with different wave lengths of light, the speed value must be known for day light, light produced by tungsten filament incandescent bulbs, and for any other light which the photographer may choose.

The behavior of the emulsion when used in connection with corrective lens filters.

The effect desired. A factor not usually considered in exposure meters is the occasional desire of the photographer to produce a photograph which will not be correctly exposed from a technical standpoint but which will have more artistic merit if under exposed or over exposed to some degree.

The above values when duly considered must be correctly evaluated and from them a suitable setting for the diaphragm aperture and exposure time must be evolved to suit the capacity of the camera to be used.

Numerous attempts have been made to assist the photographer in the selection of correct diaphragm aperture and time of exposure.

Tables or charts prepared for different light conditions and for different kinds of plates or films are well known in this art. However, tables are voluminous and require considerable study and practice to arrive at the correct result and do not meet the popular demand for a device of this kind.

Another type of device in use obtains a preliminary estimate of the prevailing light conditions by exposing a sensitized surface to the light. This type of device is not successful because of the considerable amount of time needed to obtain a reading and the expense of the sensitized paper needed in its operation.

Another type of device works on the principle of a light sensitive cell which produces an electrical current varying in intensity with the amount of light. This type of device on the market, while giving fairly satisfactory results, is unsatisfactory in that it is too delicate and expensive to meet the demands of the general users of cameras.

Still another type exposure meter operates on the principle of the sensitivity of the human eye itself. In this type of device the operator is called upon to view the object to be photographed through colored glasses of varying thicknesses. The reading in this type of exposure meter is made by estimating the point at which the outlines of the object can no longer be distinguished. This type of meter and the common variation of this type of meter are very unsatisfactory for people who use glasses and have the added disadvantage that computation is necessary before the camera setting can be made from the reading taken.

It is a well known fact that the size of the pupillary opening in the human eye is itself a measure of light intensity. This fact has been taken advantage of by designers of exposure meters. It is in this class of exposure meters that the petitioner in the instant application has directed his inventive thought.

An object of the present invention is to avoid the more prominent disadvantages of the exposure meters mentioned above and to provide the photographer with a complete, simple, and convenient instrument which will work equally well under any light conditions and with any commercial negative emulsion.

Another object of the present invention is to provide a direct reading exposure meter with a setting arrangement to account for the variation in the sensitivity of the standard films.

Another object of the present invention is to provide a direct reading exposure meter to permit the adjustment of the meter at slight variations from the normal setting to allow for taking pictures with artistic effects, such as under exposure and over exposure.

Other objects and advantages will be apparent during the course of the following description of this invention.

In the accompanying drawing forming a part of this application, and in which like numerals are employed to designate like parts throughout the same:

Fig. 1 represents an edge view of the assembled device,

Fig. 2 shows the various parts in the same relation as Fig. 1 but disassembled,

Fig. 3 represents a plan of the device as viewed from the front side with some portions cut away, Fig. 4 represents a plan of the reverse side of the device.

Fig. 5 shows a perspective view of the front disk,

Fig. 6 shows a perspective view of the second disk,

Fig. 7 shows a perspective view of the third disk, and

Fig. 8 shows a perspective view of the fourth disk.

The preferred form of this invention is illustrated in the drawing forming a part of this application consists primarily of four aligning disks provided with indices, with holes in their centers held together by a pivotal brad 50 and washer 51. The front outside disk 1 is provided with a small mirror, 2 a drawing of a human eye 3 to one half scale from which the portion representing the iris has been cut out, which will be called the iris opening 4 and an exposure time scale 5 around the outer margin. The second disk 10 is transparent except where a graduated series of black spots 11 is printed. When the second disk 10 is rotated against the first disk, these black spots 11 appear one by one through the iris opening 4 of disk 1. A small lug called an emulsion pointer 12 mounted on the back of the second disk 10 engages in a set of emulsion scale aligning notches 31 in the 4th disk 30. The third disk 20 is provided with a marginal diaphragm aperture scale 21. This diaphragm aperture scale 21 when rotated appears adjacent to the exposure time scale 5 on the front disk 1. On the back of the third disk 20 a correction pointer 22 is provided which is designed to engage with a set of correction scale aligning notches 32 in the fourth disk 30.

The fourth disk 30, viewed from the reverse side as has already been explained, contains two emulsion scales W and S representing Weston and Scheiner readings, a correction scale C to correct for possible variation in the user's eye and for corrective filters and to control the degree of under and over exposure.

The pupillary opening of the human eye, as is well known, varies with the intensity of the light entering the eye and is caused by the automatic contraction or dilation of the iris, which tends to maintain a constant light energy on the retina. The diameter of the pupil varies from 2.9 to 8 millimeters while the diameter of the iris for normal humans is about 12 millimeters no matter the age, race, or size of the individual. It follows that a direct measure of the dilation of the pupillary opening will represent in inverse proportion an approximate reading of the amount of light entering the eye. One of the most important features of my present invention is the simple direct method provided for measuring the diameter of pupillary opening by direct comparison.

For this purpose the small mirror 2 is provided on the front of my instrument in which the user may see an image of his own eye. Such an image viewed in the mirror 2 will be exactly one half as large as the actual eye, following the simple laws of reflection from plane mirrors. The size of this image as measured at the mirror will be substantially constant regardless of the distance from the user's eye. That is to say that when the instrument is held by the hand at normal distances, from about eight inches up to eighteen inches, from the eye any inaccuracies due to change in the size of the normal eye will be so negligible as to require no correction. It is therefore possible for the user to hold the mirror at any distance from the eye which is convenient to his vision.

The measurement is accomplished by comparing the mirror image of the pupillary opening with the graduated series of black spots on the second disk which can be viewed singly through the iris opening 4 in the front disk 1. To assist the user in this comparison the illusion is furthered by a drawing of an eye 3 surrounding this iris opening 4. In use an image of the user's eye appears in the mirror and closely adjacent to it can be seen a second eye of equal size in all particulars except the pupil the size of which can be varied by rotating the second disk 10 so that the various black spots 11 appear through the iris opening 4. When the black spot 11 representing the pupil in the drawing is selected which approaches most closely the pupil of the mirror image the measurement of light intensity is complete. It must be understood at this point that if one eye is more strongly illuminated than the other, equality of pupillary areas results due to the consensual action of the eyes. Thus, if the instrument, herein disclosed, is placed in front of the pupil of the right eye, the left eye may be directed toward the object the brightness of which is to be measured, and the size of the pupil of the right eye will be influenced by the light proceeding from the object, even though the right eye is obscured by the instrument.

The computing mechanism of this instrument is so arranged that the necessary correction for negative emulsion speed, correction for type of light, for filters if used, for intentional over or under exposure, and for any variation in the user's eyesight may be pre-set by setting the two pointers 12 and 22 in the proper notches on the reverse side of the instrument. This setting is to be made in advance so that when the proper black spot 11 has been chosen, the diaphragm aperture readings $f$ and exposure time readings $d$ will appear in pairs on the front side of the instrument. Each pair of figures represents a setting for the camera which will render a photograph of correct exposure.

This is accomplished in the following manner: The front disk 1, which is provided with the exposure time scale $d$ and the iris opening 4 through which the black spots are viewed, does not rotate. The second disk 10 may be rotated in relation to the first disk 1, placing the black spots 11 before the iris opening 4 one by one. The emulsion pointer 12 on the reverse side of the second disk 10 engages with the emulsion scale aligning notches 31 on the fourth disk causing it to rotate simultaneously with the second disk, for so long as the emulsion pointer 12 is engaged. By disengaging the emulsion pointer 12 and rotating the fourth disk 30 in relation to the second disk 10 and re-engaging the emulsion pointer 12 in the proper notch, it is possible to make the correction for emulsion speed and type of light.

The fourth disk 30, as explained above, is also provided with correction scale aligning notches 32 in which is to be engaged the corrective pointer 22 to the reverse side of the third disk 20. By means of scale C on which is found readings indicating over exposure and under exposure as well as the normal setting, it is possible to predetermine the extent of exposure and to correct in advance for other variations in the taking of the picture. Scale C is also used to make corrections in the use of some human eyes that are abnormal. Correction for filters, etc., is made by disengaging the correction pointer 22 rotating the third disk 20 in relation to the fourth disk 30 and the second disk 10 and re-engaging the correction pointer 22 in the proper scale aligning notch 32. It follows that when the pointers have been set only the first and second disks may be rotated freely in relation to each other while the second, third, and fourth disks are forced to rotate together as a single unit.

The setting is made by placing the proper black spot 11 so it may be viewed through the iris opening 4 after the various corrections have been made by setting the pointers in the proper notches. The final corrected reading may now be read directly from the diaphragm aperture scale f, and exposure time scale d where they appear in pairs.

In the construction of this device any suitable durable material may be used for making the first disk 1, third disk 20, and fourth disk 30, such as fiber board and the like. The second disk 10 which must be transparent is preferably constructed out of transparent Celluloid or the like. The pivot 50, washer 51, and pointers 22 and 12, may be made out of fiber, metal, or other suitable material. The mirror 2 may be constructed out of glass, or bright metal may be used instead according to common practice. However, the use of colored mirrors has been found in many cases to give better results in that such mirrors brought out the image of the pupillary opening more distinctly. Among the colors used to good advantage were yellow and red. Applicant also contemplates the use of transparent polarizing medium as an auxiliary covering for the mirror to cut out bothersome reflections.

The first step in using the exposure meter is to determine the emulsion speed of the film which is to be used. A convenient list of films may be included on the back of the instrument if desired. If the emulsion speed of the roll film, plate, motion picture film or color process film is not listed on the back of the instrument, it will be necessary to obtain this value in Weston or Scheiner units from the manufacturer of the film.

If pictures are to be taken in daylight, use the value given for daylight. If pictures are to be taken at night by artificial light, use the value given for tungsten. Of course, the value for tungsten cannot be used when the light is furnished by electric arc, neon signs, fires, or other such sources. This value must be reached by experiment.

When the emulsion speed has been determined, set the emulsion pointer 12 in the emulsion scale aligning notch 31 nearest to the correct figure on the scale, Scheiner or Weston. The setting is made by flexing the second disk 10, the Celluloid disk, until the emulsion pointer 12 can be rotated to the desired notch 31.

When the adjustment for emulsion has been made it may be left untouched for so long as the same film and type of light, (daylight or tungsten) are being used.

*Adjustment for filters*

If a haze filter, color filter, or filter of any type is to be used, it is possible to pre-set the exposure meter so as to make allowance for the increased exposure which may be necessary.

This correction is made by setting the correction pointer 22 on the back of the third disk 20 into the proper correction scale aligning notch 32. Filter factors are usually given in the following manner: x2, x3, x4, etc. This figure is usually found printed on the filter.

This setting when made, may remain untouched for as long as the filter is in use.

When no filter is to be used, leave the correction pointer 22 at "normal," or see exceptions below:

*Adjustment for intentional under or over exposure*

The provision has been made for adjustment for under or over exposure where such condition is desired by the user. Such conditions are occasionally desired to add to the attractiveness of the photograph or to provide for over exposure in deep shadow, where more detail is desired.

This adjustment is made by setting the correction pointer 22 opposite the desired condition as listed on the back of the exposure meter on the scale C of the drawing. If the dilation of the user's eye varies slightly from normal, the amount can be determined by experiment and the correction pointer set accordingly.

*How to determine the correct exposure*

The above instructions have dealt entirely with the adjustment of the scales on the back of the exposure meter. The following instructions refer to the front—(mirror side)—only:

When the scene to be photographed has been selected, stand where the camera is to be used and look directly at the scene with both eyes wide open. Now bring the exposure meter up before your eye about one foot from the face so that the line of sight of one eye is intercepted. Then with both eyes still wide open, compare in the mirror the size of the pupil of your eye with the size of the black spot 11 in the drawing just above the mirror. If the sizes of the pupils are different, rotate the back disks 10, 20 and 30 now locked together by means of pointers 12 and 22 in the respective notches 31 and 32 until the black spot 11 shows through the iris opening 4 which is identical with the pupil.

At this point, the user should be informed of two considerations. First, the distance which this exposure meter is held from the face will have only negligible effect on the ultimate reading. If the user should find it more convenient to hold the mirror at a distance greater or less than one foot from the eye, he should not hesitate to do so.

Second, the reading will not be correct if bright lights out of range of the camera are allowed to shine into the user's eye. This applies also to the case where brilliant sunlight is allowed to shine directly on the white surface of the instrument. If one hand is used as an eye shade when necessary, such an error in reading will not occur.

When the black spot 11 has been selected which is identical in size to that of the pupil of the user's eye, all manipulation of this exposure meter has been accomplished and the proper setting for your camera will be found on the two rotating scales on the front side, the diaphragm aperture scale 5 and the time exposure scale 21 (see Fig. 3 of the drawing).

With the instrument set as described above the last step is to select a suitable exposure time from the exposure time scale 5 and the correct corresponding aperture opening on the diaphragm aperture scale 21 will be found alongside the first reading.

Having thus described the invention, I claim:

1. An exposure meter for use in photography comprising a front plate, provided with a time exposure scale on its front face, and provided with a mirror on its front face adapted to reflect an image of the pupil of a human eye, said front plate being also provided with a hole immediately adjacent to the said mirror through which a spot simulating the pupil of the human eye may be viewed combined in a slidable contacting relationship with a second plate which is provided with a series of spots simulating the pupil of the eye in its varying sizes due to light intensities, the said spots being arranged on the said second plate so as to consecutively show through the said openings of the said front plate for comparison with the reflected image of the pupil of the human eye in the said mirror on the said front plate, and a third plate provided with a diaphragm aperture scale combined in a slidable and contacting relationship with the said second plate, the said diaphragm aperture scale of the said third plate being arranged to align with the said time exposure scale of the said front plate, the said second plate and the said third plate being provided with locking means whereby a relative movement of the second plate with the front plate during the comparison of the spots on the second plate with the reflected image of the eye in the mirror on the front plate causes the third plate to move with respect to the front plate and align its diaphragm opening scale with the time exposure scale of the front plate to indicate the proper diaphragm opening of a camera to correspond with a particular time setting of the camera.

2. The device as claimed in claim 1, wherein the said locking means for locking the said second plate to the said third plate comprises a fourth plate provided with a series of notches in its edge adapted to receive a lug extending from the back side of the second plate, said fourth plate being provided with a correction scale for the possible variation in the user's eyes, filter, or degree of under or over exposure aligned with the series of notches whereby the selection of one of the notches brings about a correction setting for the possible variation in the user's eyes, filter, or degree of under or over exposure.

3. The device as claimed in claim 1 wherein the said means for locking the said second plate to the said third plate comprises a fourth plate having a series of notches in its edge adapted to receive a lug extending from the back side of the said third plate, said fourth plate being provided with a film emulsion correction scale aligned with the series of notches whereby the setting of the said lug in a notch constitutes a correction setting for a film's emulsion variation.

WILLIAM E. WALLACE, Jr.